H. S. Bartholomew,
Bit Stock.
No. 1,351. Reissued Nov. 4, 1862.
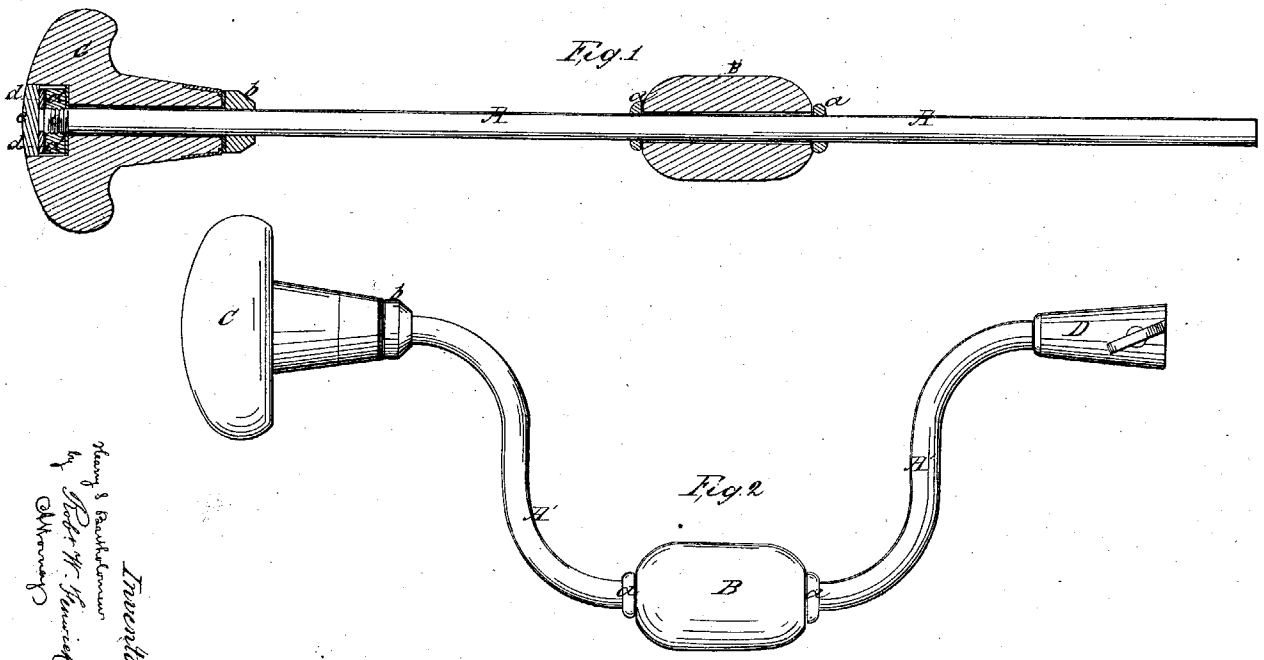
Witnesses
Benjamin H. Allen
Geo. Paul Dietrich
Inventor.
Henry S. Bartholomew
by Robt. W. Fenwick
Attorney
AM. PHOTO-LITHO. CO. N.Y. (OSBORNE'S PROCESS.)

UNITED STATES PATENT OFFICE.

HARRY S. BARTHOLOMEW, OF BRISTOL, CONNECTICUT.

IMPROVED BALL-BRACE.

Specification forming part of Letters Patent No. 32,347, dated May 21, 1861; Reissue No. 1,351, dated November 4, 1862.

*To all whom it may concern:*

Be it known that I, HARRY S. BARTHOLOMEW, of Bristol, in the county of Hartford and State of Connecticut, have invented a new and useful Improvement in Breast-Braces; and I do hereby declare that the following is a full, clear, and exact description thereof, which will be more fully shown by reference to the following drawings, in which—

Figure 1 is a section showing my invention in the first stage of its manufacture. Fig. 2 is a projection of the same as it appears when completed.

The same letters of reference in these figures indicate corresponding parts.

It is well known that the American trade in bit-braces has long been supplied from Germany, in consequence of the greater cheapness with which they can be furnished from that country. It is also well known that iron or other metals can be drawn into wire or "braziers'" rods, as they are called, or that the same may be rolled into rods of a size suitable for this purpose at far less cost than it could be forged or constructed in any other way.

My invention consists in a simple and cheap method of constructing the main portion of the brace from rods or wire so made, which will be so cheap in proportion to their intrinsic strength and value as to enable the American to compete successfully with the German manufacturer in furnishing the article of equal or even greater value, and at less cost than it can be afforded for when made in any other way in this or any other country.

By reference to Fig. 1 my usual mode of construction will be made very plain. I prefer using a wire rod of the proper size, which is drawn cold so as to leave the metal bright. Such rods are cut in pieces the proper length, and, if deemed desirable, then placed in a barrel with leather chips and subjected to a rolling motion until they are polished. If rolled are used, they may be first placed in a pickle of sulphuric acid, and then polished in the same manner as the wire rods are polished; or they may be prepared in various other ways known in the trade.

The pieces of rods suitably prepared may now be finished off and shaped to suit the purpose intended in the following manner: A tabular, oval, or ball-shaped block, B, made from a single piece of wood or other material, may be slipped upon the rod A before it is bent, and confined at the proper point in any practical way. In the drawings two ring-collars, *a a*, are shown as being employed for that purpose. These collars may be shrunk or otherwise fastened upon the rod against or near the ends of the block. The same end might be attained by cutting a groove round the rod and passing a key-pin down through the ball so as to have it extend into the groove in a manner not to interfere with the revolution of the ball, but to prevent longitudinal play thereof. In fact, this ball may be secured in various ways without departing from the spirit of my invention under this head, which is the making of the ball in one piece, and preventing end sliding of it while it revolves. The ball is for the operator to grasp while he operates the brace, and as it is subjected to considerable strain it requires to be strong and durable. By having it in one piece or undivided it would be much stronger and more lasting than the divided pinned ball used on the German brace.

The breast-block C and bit-holder D are separate fixtures to the brace-rod A. In the drawings the breast-block is shown as confined on the rod A by a collar, *b*, shrunk or otherwise applied to the rod, and a nut, *d*, screwed or otherwise fastened upon the upper end of the rod, so as to hold the breast-block from sliding while the brace revolves. Any other practical modes known in the trade of fastening the breast-block may be adopted. The bit-holder D may be either cast or wrought to the desired form or of any practical configuration, and may then be shrunk, keyed, screwed, or otherwise fastened firmly upon the lower end of the rod A, and the rod then bent into the desired shape by methods so simple as to need no description. If preferred, the bit-holder may be applied after the rod A has been bent.

There is a great advantage in having the bit-holder made separate from the main portion A of the brace, and this separate construction it arises from this leading idea of my invention—viz., the making of the main portion of the brace out of drawn or rolled rods of metal. The separate bit-holders can be cast or wrought at a smaller cost than those which are formed directly upon the metal of which the brace is made, and when worn out or broken can be readily replaced at a smaller cost than what would be incurred in the other case, for there is no remedy when the bit-holder of ordinary braces are broken but to buy a new brace. Again, the separate bit-holder admits of different sizes being used on the same brace, as occasion may demand.

Although I deem it to be of essential importance to secure the revolving block B in an undivided condition upon the rod A, it might be constructed otherwise and still not depart from the first or leading part of my invention—viz., the making of the brace out of drawn or rolled metal rods. One different method would be to turn a groove of the length of the ball in the circumference of the rod. In that case the block might be made in two parts and fastened together upon the brace after it had been bent. This mode of securing the ball would be old, but the brace would be novel, from the fact of being made out of drawn or rolled metal rods.

Instead of driving or shrinking the bit-holder D upon the lower end of the rod A, an eye may be made in the end of the rod to receive it, or a hole may be drilled through the upper end of the bit holder of a size just sufficient to receive the lower end of the rod, and in either the plan shown or those just described a set-screw may be used to maintain the junction of the brace and bit-holder. Other modes of constructing the different parts of the brace may be contrived; but I prefer those already described.

I do not therefore limit myself to any particular method of finishing up the brace in regard to any of its parts, nor of polishing and preparing the wire or rolled rods preparatory to bending them into form; but What I do claim, and desire to secure by Letters Patent, is—

1. A breast-brace, A, the main portion of which is made from a rod of metal, substantially as set forth, and for the purpose described.

2. A breast brace, A, the main portion of which is made from a rod of metal, substantially as described, in combination with a bit-holder made separate from the rod and suitably attached to it, substantially as and for the purpose set forth.

3. A breast-brace, A, with its ball made in one piece and secured upon it so as to maintain its proper position and to revolve, substantially as set forth.

HARRY S. BARTHOLOMEW.

Witnesses:
H. BECKWITH,
HENRY A. SEYMOUR.